United States Patent [19]

Schulte et al.

[11] 3,979,955
[45] Sept. 14, 1976

[54] FLOWMETER

[75] Inventors: Fritz Schulte, Ludenscheid; Gerhard Clever, Nachrodt-Wiblingwerde; Günter Kuhfs, Schalksmuhle, all of Germany

[73] Assignee: Ludwig Grefe GmbH, Ludenscheid, Germany

[22] Filed: Dec. 2, 1974

[21] Appl. No.: 528,896

[30] Foreign Application Priority Data
Dec. 3, 1973 Germany............................ 2360097

[52] U.S. Cl. .................................................. 73/228
[51] Int. Cl.² .......................................... G01N 1/28
[58] Field of Search ............. 73/228, 208, 209, 239

[56] References Cited
UNITED STATES PATENTS 3,119,262  1/1964  Wright et al.......................... 73/228
3,188,421  6/1965  Rowell.................................. 73/228
3,862,628  1/1975  Williams ............................. 73/228

FOREIGN PATENTS OR APPLICATIONS
199,492  6/1923  United Kingdom.................. 73/228

Primary Examiner—Richard C. Queisser
Assistant Examiner—Stephen A. Kreitman
Attorney, Agent, or Firm—Ernest G. Montague; Karl F. Ross; Herbert Dubno

[57] ABSTRACT

A flowmeter utilizes an impingement plate as a measuring element, which is attached to yieldably resilient means, such as a tension or compression spring, elastic rubber or the like rod or tube disposed along the longitudinal axis of a tapered transparent sleeve within a housing inserted into a conduit through which a fluid, whose flow is to be measured, causes the deviation of the plate from a normal position depending on the volume rate of flow of fluid, passing through the tube and being readable on a scale.

1 Claim, 4 Drawing Figures

// FLOWMETER

FIELD OF THE INVENTION

Our invention relates to a flowmeter for measuring the flow of a liquid in a conduit.

BACKGROUND OF THE INVENTION

Known flowmeters make use of a floating element inserted into a conduit through which fluid is flowing. The measurement device consists of a tapered sleeve and a floating element fitting therein, the fluid being required to pass therethrough vertically from the bottom to the top. The floating element remains in its bottom position if no flow of fluid takes place, but is lifted therefrom, if fluid passes through the tapered sleeve, the degree of lift depending on the flow rate of fluid streaming therethrough.

The degree of deviation of the floating element from a normal position is either readable directly on a scale or the like, or transformable electrically or magnetically into an analog value.

Flowmeters of this type suffer from the disadvantage that the measurement device can only be used vertically, i.e. the longitudinal axis of the tapered sleeve must assume a strictly vertical position, so that the floating element can rise and fall along that axis in a vertical direction.

Any deviation from the vertical causes the measurement to be erroneous; an inclined position of the floating element, for example, causes it to deviate from its center position and press against a wall of the tapered sleeve, while the fluid passes through an unduly large opening arising between the floating element and the opposite wall of the tapered sleeve.

OBJECT OF THE INVENTION

It is accordingly an object of our invention to avoid the aforesaid disadvantages and to provide a flowmeter which can be utilized in either a vertical, horizontal or inclined position and in any flow direction.

SUMMARY OF THE INVENTION

A flowmeter according to the invention includes a housing insertable into a conduit formed with an inlet and an outlet, a conically shaped frustoconical or tapered measuring tube being connected thereto with respective ends and disposed within the housing. An impingement plate within the transparent tube deviates from a normal position in dependence on the amount of fluid passing through the tube, the position of the plate being readable thereon; a spring or other elastic material is disposed along the longitudinal axis of the tube and is attached to the bouncing plate.

BRIEF DESCRIPTION OF THE DRAWING

Our invention will be better understood with the aid of the accompanying drawing in which.

SPECIFIC DESCRIPTION

Figure 1:
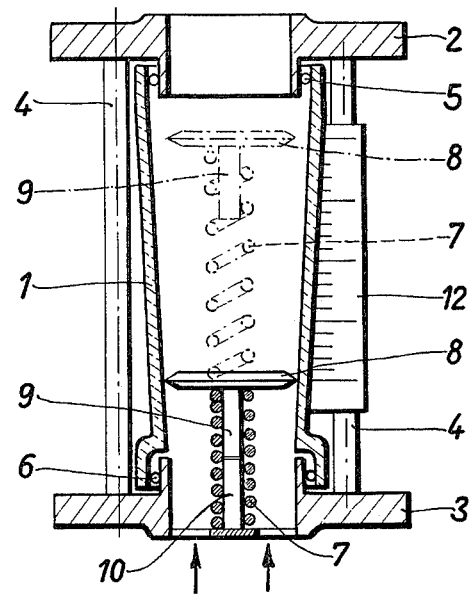
FIG. 1 shows a flowmeter using a tension spring and an impingement plate attached thereto in fragmentary elevational cross-section.

FIG. 1 shows a conical transport measuring tube 1 provided on its respective ends with flanges 2 and 3 for insertion into a conduit, flanges 2 and 3 being joined to each other by spacing rods 4 to relieve any load on tube 1. Sealing rings 5 and 6 prevent any liquid leaks from arising between tube 1 and respective flanges 2 and 3. A tension spring 7 is disposed on the lower bottom portion of flange 3 having an upper end engaging an impingement plate 8, bolts 9 and 10 being respectively attached to flange 3 and impingement plate 8 for letting the latter settle into a normal position when a liquid in tube 1 is stationary; this is important if a scale is attached to measuring tube 1. If the latter consists of glass, a reading scale 12 can be attached thereto directly; alternatively readings can be obtained by magnetic or inductive means, particularly if measuring tube 1 is made of plastic or metal.

If liquid commences to flow in the direction of arrow 7, impingement plate 8 is pressed upwards against the resistance of tension spring 7, the former therefore being lifted from its normal position by a distance corresponding to the amount of liquid passing through measuring tube 1. This distance therefore provides a measure of that amount of liquid and is readable on scale 12. The maximum amount of liquid passing through tube 1 would raise impingement plate 8 to a position shown as a dash-dot-dash line in FIG. 1.

Figure 2:
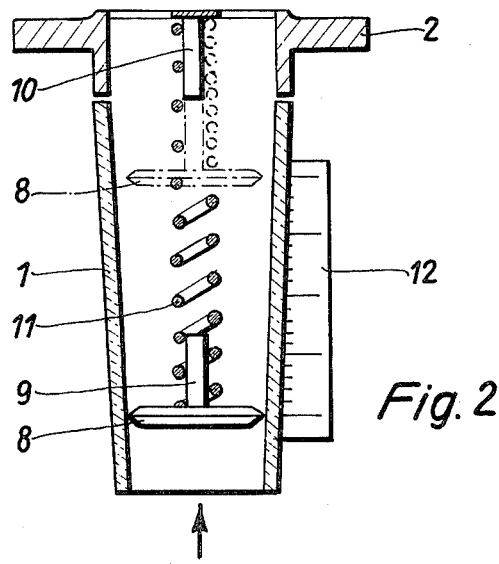
FIG. 2 shows another flowmeter using a compression spring and an impingement plate attached thereto in fragmentary diagrammatic elevational cross-section.

In FIG. 2, instead of tension spring 7, which is extended from its normal position, there is disposed a compression spring 11 extending over its greatest length in the initial position of impingement plate 8. Since the latter closes off the inner diameter of measuring tube 1 completely during that initial position, measuring tube 1 would have to be inserted into the conduit in a reversed position, in the event liquid flows from top to bottom. In the latter case, and also where measuring tube 1 is positioned at an incline, scale 12 would have to be appropriately calibrated to take the prevailing direction of flow into account.

Figure 3:
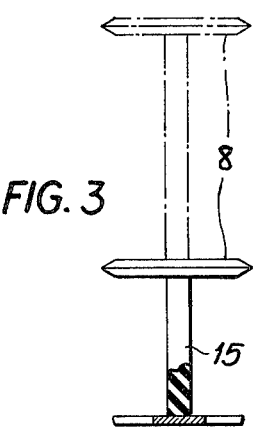
FIGS. 3 and 4 show details of flowmeter systems using rods of elastomeric material.
Figure 4:
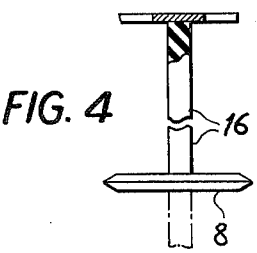

In lieu of respective tension and compression springs 7 and 11 it is also possible to use elastic materials, such as rubber rods 15 and 16 and the like for acting against impingement plate 8 (see FIGS. 3 and 4). The flowmeter can be used for measuring the flow of both a liquid and a gas.

We claim:
1. A flowmeter comprising:
   an elongated housing formed with an annular inlet fitting at one end, an annular outlet fitting at the opposite end, and means connecting said fittings whereby said fittings are attachable to respective portions of a pipe line in which the flowmeter is insertable, said fittings having axially aligned openings adapted to be traversed by a fluid in said pipeline;
   a frustoconical measuring tube disposed within said housing and tapering from said outlet fitting toward said inlet fitting, said tube being of substantially uniform well thickness;
   a planar imperforate circular disk disposed within said tube and lying transverse to the axis thereof while being of a diameter greater than the smallest internal diameter of said tube, said disk contacting said tube with only line contact;
   a resilient element anchored to one of said fittings and bearing axially upon said disk for urging same toward the narrow end of said tube and the periphery thereof into engagement with a frustoconical wall of the tube at the narrow end thereof, said element being the sole means connecting said disk to said fittings; and a scale mounted along said tube and cooperating with said disk for indicating the flow rate of a fluid traversing said tube from said inlet fitting to said outlet fitting upon deflection of said disk by the flowing fluid.

* * * * *